No. 773,356. PATENTED OCT. 25, 1904.
C. WAGGONER.
APPARATUS FOR COATING NAILS.
APPLICATION FILED AUG. 26, 1903.
NO MODEL. 3 SHEETS—SHEET 1.
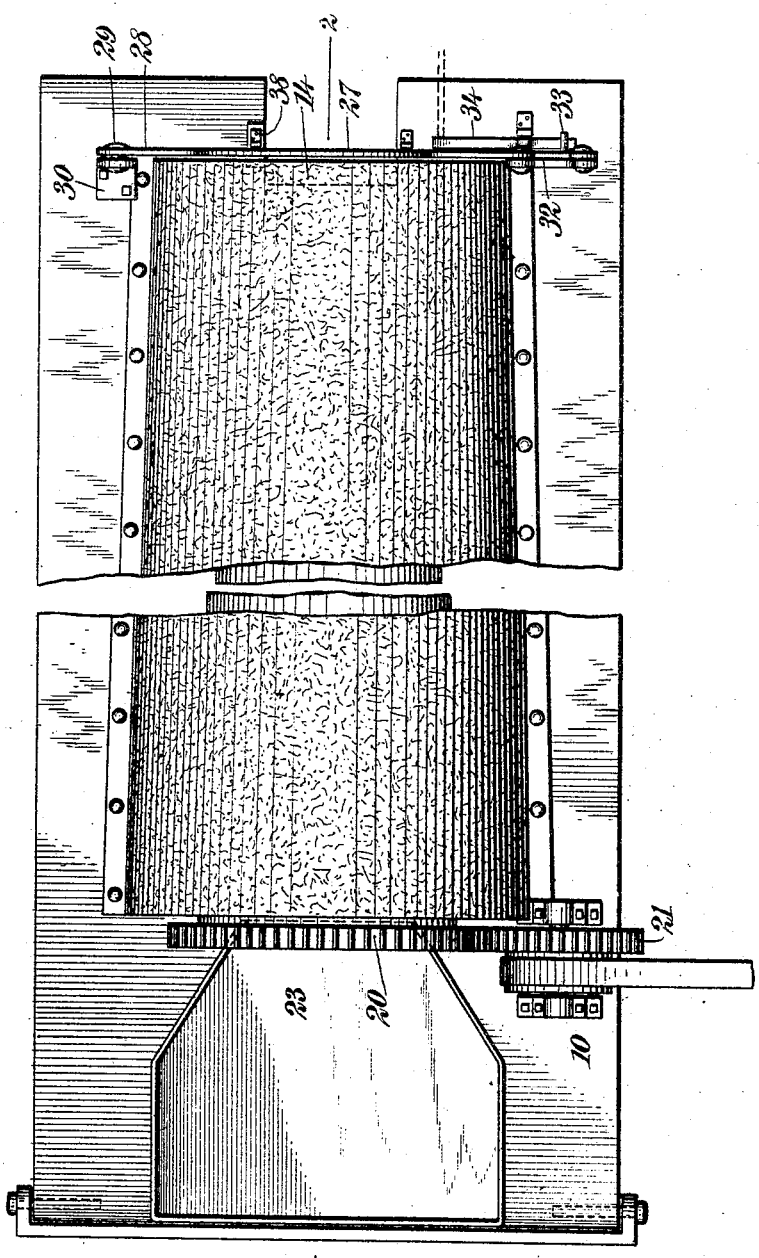
WITNESSES:
J. A. Brophy
Isaac B. Owens
INVENTOR
Charles Waggoner
BY
Munn & Co.
ATTORNEYS

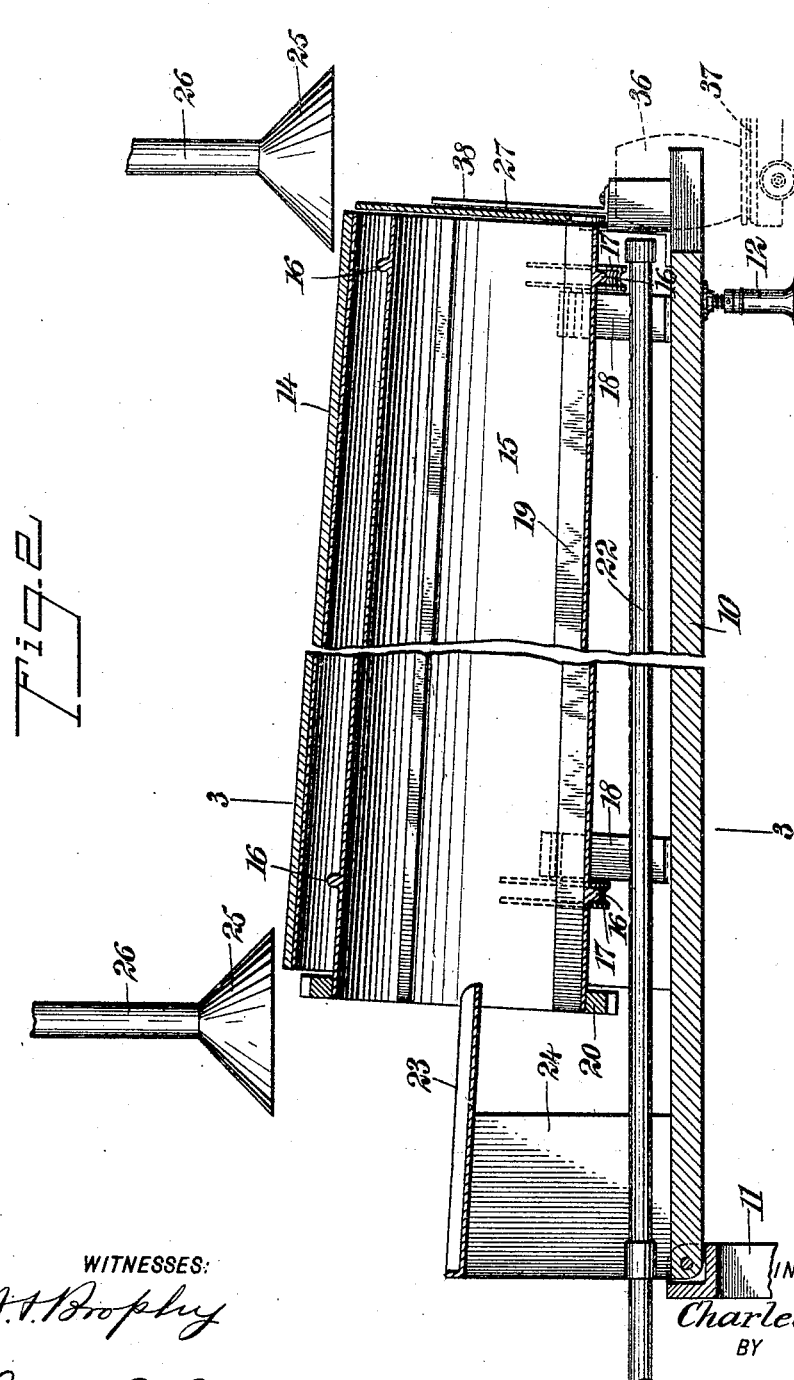

No. 773,356. PATENTED OCT. 25, 1904.
C. WAGGONER.
APPARATUS FOR COATING NAILS.
APPLICATION FILED AUG. 26, 1903.
NO MODEL. 3 SHEETS—SHEET 3.
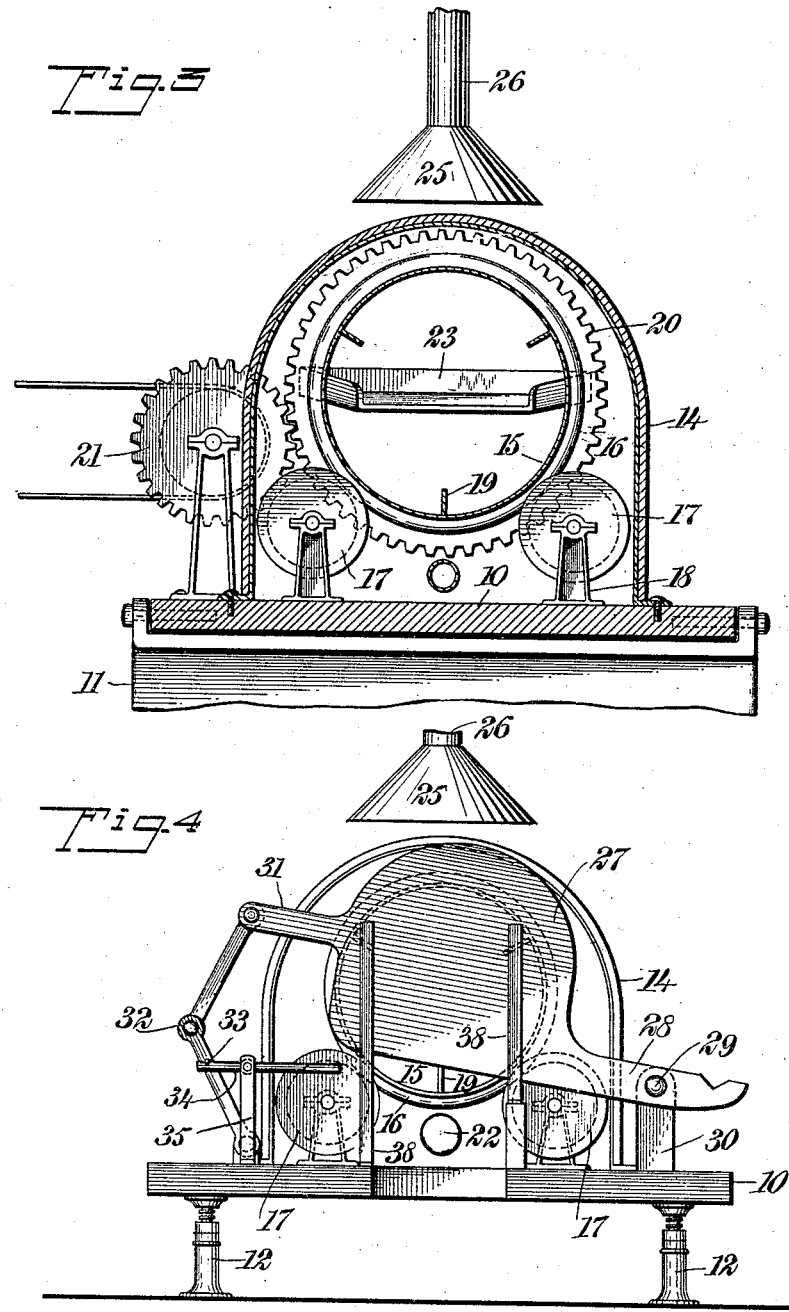
WITNESSES:
J. H. Brophy
Isaac B. Owens.
INVENTOR
Charles Waggoner
BY
ATTORNEYS No. 773,356.                                    Patented October 25, 1904.

UNITED STATES PATENT OFFICE.

CHARLES WAGGONER, OF KOKOMO, INDIANA.

APPARATUS FOR COATING NAILS.

SPECIFICATION forming part of Letters Patent No. 773,356, dated October 25, 1904.

Application filed August 26, 1903. Serial No. 170,807. (No model.)

*To all whom it may concern:*

Be it known that I, CHARLES WAGGONER, a citizen of the United States, and a resident of Kokomo, in the county of Howard and State of Indiana, have invented a new and Improved Apparatus for Coating Nails, of which the following is a full, clear, and exact description.

This invention relates to apparatus intended particularly for coating nails with a cement compound, but useful for various other analogous purposes, as will be seen by skilled mechanics.

The invention involves various novel features of construction and arrangement of parts, all of which will be fully set forth hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of the invention. Fig. 2 is a longitudinal section on the line 2 2 of Fig. 1. Fig. 3 is a cross-section on the line 3 3 of Fig. 2, and Fig. 4 is an elevation of the discharge end of the apparatus.

10 indicates the base of the apparatus, the receiving or front end of which is hingedly mounted on a suitable support 11, while the opposite end is adjustable vertically by means of a suitable jack or jacks 12, the purpose of which adjustment will be hereinafter fully set forth.

14 indicates an asbestos-covered casing which is mounted on the base 10 and which is open at each end. In this casing is arranged a slightly-conical drum 15, having annular ribs 16 running on grooved carrying-wheels 17, mounted on the base 10 through the medium of pedestals 18. Said drum is provided in its interior with longitudinal blades or wings 19, which serve to guide the material within the drum as said drum revolves.

Fastened to the large end of the drum 15 is a spur-gear 20, and in mesh with this gear is a driving-pinion 21, by which arrangement a rotary motion is given to the drum. Beneath the drum is a heating apparatus, here shown in the form of a gas-burner 22, and at the receiving end of the drum a table 23 is supported by means of a pedestal 24, said table being tapered, as shown in Fig. 1, so as to discharge into the drum 15. The smoke and other gases escaping from the burner 22 and from the interior of the drum 15 is collected in hoods 25, which are arranged at each end of the drum and have pipes 26 passing upward therefrom into the atmosphere.

As best shown in Fig. 4, the discharge end of the drum is provided with a gate 27, having a shank 28 pivoted at the point 29 on a support 30 rising from the base 10, said shank projecting beyond the pivot and being adapted to carry a counterweight, (not shown,) so as to balance the gate on the pivot 29. This gate is arranged to move vertically past the discharge or small end of the drum 15 and furnish a complete closure therefor and has a projecting arm 31, to which is connected one end of a toggle 32, the other end of the toggle being pivoted on the base 10. 33 indicates a pin attached to the toggle, and 34 indicates a lever fulcrumed on a support 35, rising from the base 10. This lever is adapted to engage the pin 33 and hold the gate 17 elevated to any extent desired, this being dependent upon the position of the pin 33 on the toggle 32. When the gate is opened, the contents of the drum may be discharged therefrom; but when the gate is closed the drum turns without the escape of any of its contents. As indicated by the broken lines in Fig. 2, a keg 36 is in practice arranged at the discharge end of the drum to receive the contents of the drum.

37 indicates a scale of any suitable sort, the beam of which is in connection with the lever 34, so that when said beam is in its lower position the lever 34 will be held in the active position shown in Fig. 4. When, however, the beam is raised, the left-hand end of the lever is thrown down, and the toggle 32 then collapses to allow the return of the gate 27 to its closed position. As the contents of the drum run into the keg the weight of the keg and its contents increases, and the scale should be adjusted so that when the desired weight has been emptied into the keg the beam will rise and the gate 27 fall, thus cutting off the supply. The keg may then be removed and an empty keg placed in its stead.

The manner of using the invention will, it is thought, be clear from the foregoing description.

Assuming that the apparatus is used to coat nails with a cement compound, the nails are first emptied on the table 23 and the cement compound, usually about a handful, is spread over the nails, and the whole is then introduced into the drum 15, which being in rotation and being heated by the flame from the burner 22 thoroughly agitates the nails and the compound, causing the nails to be thoroughly coated. Owing to the inclination of the drum, the nails gradually work toward the discharge end thereof. By adjusting the jacks 12 the inclination of the base, and consequently of the drum, may be made any degree desired, suiting the apparatus to handle nails of any size. The asbestos-covered case 14 protects the drum from the surrounding air and enables a high heat to be maintained in the drum.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a base, a support to which one end of the base is hinged, means for adjustably supporting the other end of the base, a revoluble drum mounted on the base, means for driving the drum, the drum being open at each end, a feed device at one end of the drum, a gate at the other end, said gate being mounted on the base, and an operating-lever fulcrumed upon the base and pivotally connected with the gate.

2. The combination of a base, a revoluble drum thereon, a gate mounted on the base and coacting with the drum at one end thereof, a toggle mounted on the base and connected with the gate, and means for actuating the toggle.

3. The combination of a base, a revoluble drum thereon, a gate mounted on the base and coacting with the drum at one end thereof, a toggle connected with the gate, and means for actuating the toggle, said means comprising a lever mounted on the base and coacting at one end with a part on the toggle.

4. An apparatus for coating nails, comprising a base, a revoluble drum mounted thereon and open at each end, a feeding device at one end of the drum, a gate at the other end of the drum, a case mounted on the base and inclosing the drum, said casing being open at each end, a heater under the drum, and means including a hood or collector at each end of the drum for carrying off the gases escaping therefrom.

5. The combination of a base, a drum mounted thereon, a gate mounted to swing vertically on the base and coacting with the drum at one end thereof, a toggle-bearing between the free end of the gate and the base, a lever, and a support mounted on the base and having the lever fulcrumed thereon, said lever engaging a pin on one link of the toggle, for the purpose specified.

In testimony whereof I have signed my name to this specification in the presence of two subscribing witnesses.

CHAS. WAGGONER.

Witnesses:
CHAS. JINKERSON,
JOHN CARVER.